United States Patent
Fries

(10) Patent No.: US 6,940,277 B2
(45) Date of Patent: *Sep. 6, 2005

(54) GIANT MAGNETORESISTANCE BASED NANOPOSITIONER ENCODER

(75) Inventor: David P. Fries, St. Petersburg, FL (US)

(73) Assignee: University of South Florida, Tampa, FL (US)

(*) Notice: Subject to any disclaimer, the term of this patent is extended or adjusted under 35 U.S.C. 154(b) by 46 days.

This patent is subject to a terminal disclaimer.

(21) Appl. No.: 10/651,160

(22) Filed: Aug. 28, 2003

(65) Prior Publication Data

US 2004/0036469 A1 Feb. 26, 2004

Related U.S. Application Data

(63) Continuation-in-part of application No. 09/715,339, filed on Nov. 17, 2000, now Pat. No. 6,633,233.

(51) Int. Cl.[7] ............................ G01B 7/14; G01B 7/30; G01R 33/06; H01L 43/08
(52) U.S. Cl. .............................. 324/207.24; 324/207.21
(58) Field of Search ......................... 324/207.11, 207.2, 324/207.21, 207.24, 207.25, 174

(56) References Cited

U.S. PATENT DOCUMENTS

| | | | |
|---|---|---|---|
| 3,739,158 A | 6/1973 | Woodward | 318/635 |
| 3,899,779 A | 8/1975 | Malozemoff | 365/2 |
| 3,996,571 A | 12/1976 | Chang | 365/3 |
| 4,031,526 A | 6/1977 | Archer et al. | 365/8 |
| 4,246,474 A | 1/1981 | Lazzari | 235/450 |
| 4,326,188 A | 4/1982 | Dahlberg | 338/325 |
| 4,510,802 A | 4/1985 | Peters | 73/505 |
| 4,629,982 A | 12/1986 | Kieslich | 340/672 |
| 4,864,288 A | 9/1989 | Cross | 340/669 |
| 5,047,676 A | * 9/1991 | Ichikawa | 310/12 |
| 5,521,494 A | * 5/1996 | Hore et al. | 324/207.16 |
| 5,600,064 A | 2/1997 | Ward | 73/504.04 |
| 5,675,459 A | 10/1997 | Sato et al. | 360/325 |
| 5,729,137 A | 3/1998 | Daughton et al. | 324/252 |
| 5,744,950 A | * 4/1998 | Seefeldt | 324/166 |
| 5,825,593 A | 10/1998 | Mowry | 360/113 |

(Continued)

OTHER PUBLICATIONS

Sang–Soon Ku et al., Design, Fabrication, and Real–Time Neural Network Contrl of a Three–Degree–of–Freedom Nanopositioner, 2000, IEEE/ASME Transactions on Mechatronics, vol. 5, Issue 3, entire paper.*

Publication entitled "Why Nanopositioning Is More Than Just Nanometers—or How To Find A State–of–the–Art System" reprinted from: Polytek PI, Inc. by Stefan Vorndran; copyright 2002–2003; http://www.physikinstrumente.de/pdf/State-of-the-Art-NanoPositioningSystemsPI.pdf.

Giant Magneto–Resistance Devices, authored by E. Hirota, H. Sakakima and K. Inomata, and published by Springer Series In Surface Sciences (Book cover title page; preface; table of contents and Section 4.3.1 (pp. 100–105).

*Primary Examiner*—Jay Patidar
(74) *Attorney, Agent, or Firm*—Howard & Howard

(57) ABSTRACT

An encoder (10) for a nanopostioner (24) includes a strip of magnetic bits (18) for producing discrete magnetic fields and a giant magnetoresistor (GMR) (14) which changes in electrical resistance in response to changes in the magnetic fields. The GMR (14) is connected to a mass (12) which moves along a path proximate to the strip of magnetic bits (18). A voltage sensor (20) is connected to the GMR (14) to produce digital signals based on the changes in electrical resistance of the GMR (14). A processor (22) calculates the position of the nanopositioner (24) based on the digital signals.

2 Claims, 1 Drawing Sheet

U.S. PATENT DOCUMENTS

| | | | |
|---|---|---|---|
| 5,831,553 A | * 11/1998 | Lenssen et al. | 341/20 |
| 5,903,085 A | 5/1999 | Karam | 310/328 |
| 5,939,879 A | * 8/1999 | Wingate et al. | 324/207.17 |
| 5,998,989 A | * 12/1999 | Lohberg | 324/174 |
| 6,111,716 A | 8/2000 | Ngo et al. | 360/67 |
| 6,154,025 A | * 11/2000 | Schelter et al. | 324/207.21 |
| 6,181,036 B1 | * 1/2001 | Kazama et al. | 310/68 B |
| 6,466,010 B1 | * 10/2002 | Moerbe | 324/207.21 |
| 6,550,329 B1 | 4/2003 | Watson | 73/504.13 |
| 6,633,233 B1 | * 10/2003 | Fries | 340/669 |

\* cited by examiner

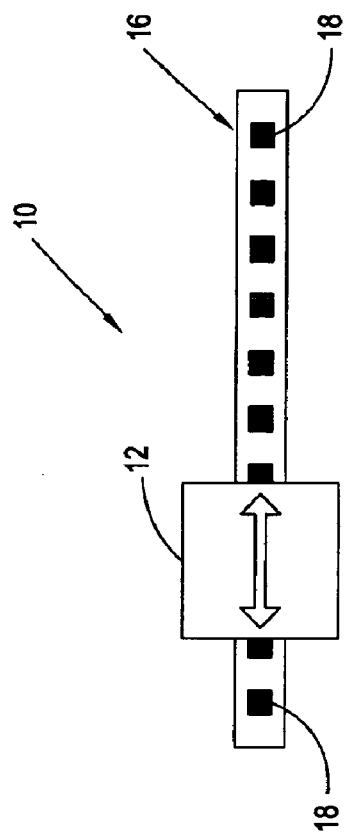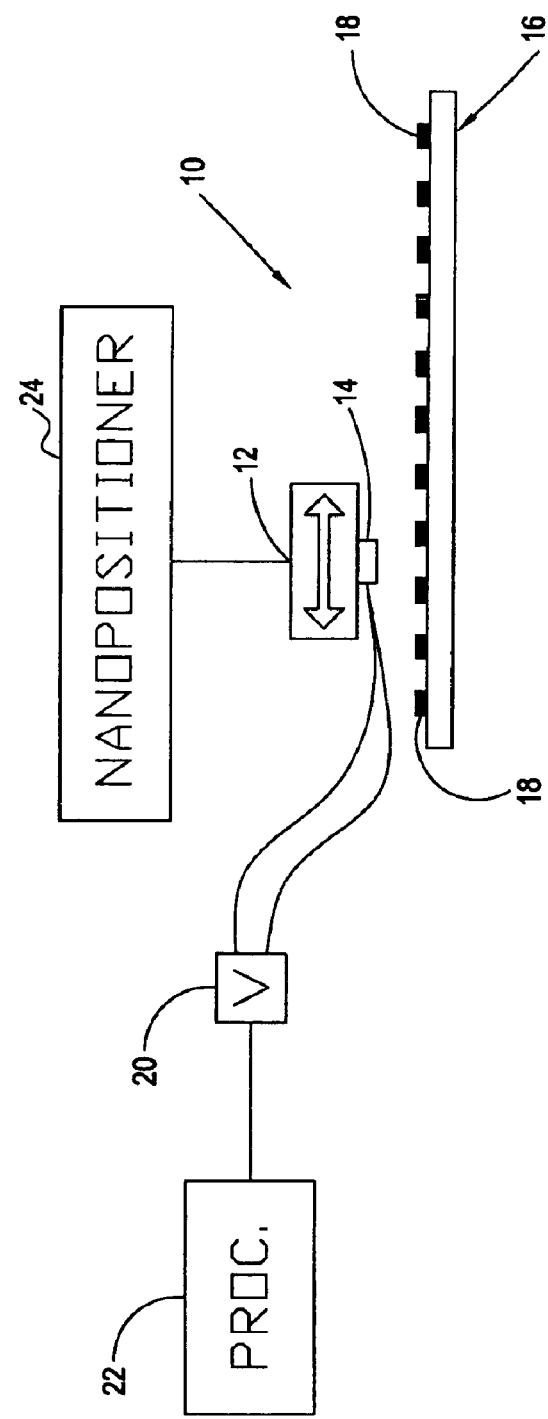

GIANT MAGNETORESISTANCE BASED NANOPOSITIONER ENCODER

CROSS-REFERENCES TO RELATED APPLICATIONS

The subject patent application is a continuation-in-part of U.S. patent application Ser. No. 09/715,339, filed Nov. 17, 2000, now U.S. Pat. No. 6,633,233, issued Oct. 14, 2003.

BACKGROUND OF THE INVENTION

1. Field of the Invention

The subject invention generally relates to an encoder for determining position. Specifically, the subject invention relates to an encoder for determining the position of a nanopositioner using giant magnetoresistor (GMR) technology.

2. Description of the Related Art

A number of devices and methods are currently used to determine position in nanopositioner systems. For example, a laser interferometer may be used to measure position. However, an output of a laser interferometer is not perfectly linear, leading to significant errors in the position measurement, on the order of 2 to 5 nanometers.

A two-plate capacitive sensor may also be used to measure position. This type of capacitive sensor uses two plates: a fixed plate and a movable plate. The movable plate is connected to an object being positioned. A capacitance is measured between the two plates to determine the position. When used over a small range, a capacitive sensor provides high linearity with resolutions of 0.1 nanometers. However, capacitive sensors are not best suited for nanopositioning applications over a long range, since the capacitance between the two plates approaches zero as the movable plate moves further and further away from the fixed plate.

BRIEF SUMMARY OF THE INVENTION AND ADVANTAGES

The invention provides an encoder that includes a magnetic element that produces a magnetic field and a mass to move along a path which passes through the magnetic field. A giant magnetoresistor (GMR) is operatively connected to the mass for changing in electrical resistance in response to changes in the magnetic field produced by the magnetic element. A voltage sensor is connected to the GMR for sensing the voltage across the GMR. The magnetic element includes a strip of magnetic bits to provide discrete magnetic fields regions disposed linearly relative to one another along the path. The mass and the magnetic bits are supported for movement relative to one another along the path to produce digital signals from the voltage sensor.

The encoder of the present invention is able to provide position measurements with high accuracy. The accuracy of the encoder is not limited by any range of positions to be measured.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a top view of a giant magnetoresistance based encoder according to the subject invention; and FIG. 2 is a side view of the giant magnetoresistance based encoder, including a nanopositioner, a voltage sensor, and a processor.

DETAILED DESCRIPTION OF THE INVENTION

Referring to the Figures, wherein like numerals indicate like or corresponding parts throughout the several views, a giant magnetoresistance based encoder is shown at 10.

The encoder 10 includes a mass 12 to move along a path. In a preferred embodiment, the mass 12 is operatively connected to a nanopositioner 24. However, one should appreciate that the present encoder 10 may be implemented outside the nanopositioning realm.

The nanopositioners 24 is a device that controls motion at the nanometer level. The nanopositioner 24 is typically used in the fields of scanning microscopy, nano-imprinting, nano-manufacturing, etc. Piezoelectric actuators are commonly used to drive nanopositioning devices. Thus, the nanopositioner 24 may also be referred to as a piezoelectric postioner, a piezo actuator, or a piezonanopositioner.

The encoder 10 further includes a giant magnetoresistor (GMR) 14. The GMR 14 is operatively connected to the mass 12. Those skilled in the art appreciate that that the GMR 14 is also commonly referred to as a spin valve sensor. One typical configuration of the GMR 14 includes a layer of a non-metallic element, such as chromium or copper, sandwiched between layers of a magnetic element, such as iron or cobalt. This results in magnetization of the magnetic elements pointing in opposite directions. Due to this phenomenon, the GMR 14 exhibits a change in electrical resistance when exposed to a magnetic field. Those skilled in the art realize that other configurations of the GMR 14 can also be fashioned to achieve the change in electrical resistance during exposure to the magnetic field.

The encoder 10 also includes a magnetic element 16. The magnetic element 16 is located proximate to the GMR 14 to produce the magnetic field. As described above, the GMR 14 changes in electrical resistance due to changes in the magnetic field produced by the magnetic element 16. The magnetic element 16 includes a strip of magnetic bits 18. The magnetic bits 18 provide discrete magnetic field regions disposed linearly relative to one another along the path.

The encoder 10 further includes a voltage sensor 20. The voltage sensor 20 is operatively connected to the GMR 14 for sensing a voltage across the GMR 14. The voltage sensor 20 applies a supply voltage to the GMR 14 and senses a return voltage from the GMR 14. The return voltage will change as the electrical resistance of the GMR 14 changes.

The mass 12 and the magnetic bits 18 are supported for movement relative to one another along the path to produce digital signals from the voltage sensor 20. The encoder 10 also includes a processor 22 operatively connected to the voltage sensor 20. The processor 22 determines a position of the mass 12 based on the digital signals. The position of the mass 12 is correlated to a position of the operatively connected nanopositioner 24 for use in controlling the movement of the nanopositioner 24.

Several procedures may be employed by the processor 22 to determine the position of the mass 12 or the nanopositioner 24 based on the digital signals. In a first procedure the processor 22 counts the number of digital signals received, which corresponds directly to the number of magnetic bits 18 passed by the GMR 14. Assuming the processor 22 knows a direction of travel of the mass 12 and a distance between the magnetic bits 18, then the position of the magnetic bits 18 can be easily calculated. In a second procedure, the magnetic bits 18 or groups of magnetic bits 18 have varying magnetic characteristics. The varying magnetic characteristics allows the processor 22 to determine the direction of travel of the mass 12 or the nanopositioner 24. Calculating the position is then the same as in the first procedure. Other procedures for determining the position of the mass 12 or the nanopositioner 24 are evident to those skilled in the art.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. An encoder (10) for determining position comprising:
    a magnetic element (16) producing a magnetic field;
    a mass (12) to move along a path and passing through said magnetic field;
    a nanopositioner (24) operatively connected to said mass (12) for moving said mass (12);
    a giant magnetoresistor (GMR) (14) operatively connected to said mass (12) for changing in electrical resistance in response to changes in said magnetic field produced by said magnetic element (16);
    a voltage sensor (20) operatively connected to said GMR (14) for sensing a voltage across said GMR (14);
    said magnetic element (16) including a strip of magnetic bits (18) providing discrete magnetic field regions disposed linearly relative to one another along said path; and
    said mass (12) and said magnetic bits (18) being supported for movement relative to one another along said path to produce digital signals from said voltage sensor (20).

2. An encoder (10) as set forth in claim 1 further comprising a processor (22) operatively connected to said voltage sensor (20) for determining a position of said nanopositioner (24) based on said digital signals.

* * * * *